United States Patent
Poelman et al.

(10) Patent No.: US 9,508,186 B2
(45) Date of Patent: Nov. 29, 2016

(54) PRE-SEGMENT POINT CLOUD DATA TO RUN REAL-TIME SHAPE EXTRACTION FASTER

(71) Applicant: Autodesk, Inc., San Rafael, CA (US)

(72) Inventors: Ronald Poelman, San Rafael, CA (US); Oytun Akman, Kensington, CA (US)

(73) Assignee: Autodesk, Inc., San Rafael, CA (US)

( * ) Notice: Subject to any disclaimer, the term of this patent is extended or adjusted under 35 U.S.C. 154(b) by 193 days.

(21) Appl. No.: 14/536,266

(22) Filed: Nov. 7, 2014

(65) Prior Publication Data

US 2015/0125071 A1    May 7, 2015

Related U.S. Application Data (60) Provisional application No. 61/901,069, filed on Nov. 7, 2013.

(51) Int. Cl.
  *G06K 9/00* (2006.01)
  *G06T 15/04* (2011.01)
  *G06T 15/40* (2011.01)
  *G06T 17/00* (2006.01)
  *G06K 9/46* (2006.01)
  *G06T 7/00* (2006.01)

(52) U.S. Cl.
  CPC .............. *G06T 15/04* (2013.01); *G06K 9/4604* (2013.01); *G06T 7/0083* (2013.01); *G06T 7/0089* (2013.01); *G06T 15/405* (2013.01); *G06T 17/005* (2013.01); *G06T 2207/10012* (2013.01); *G06T 2207/20112* (2013.01); *G06T 2210/56* (2013.01)

(58) Field of Classification Search
  None
  See application file for complete search history.

(56) References Cited

U.S. PATENT DOCUMENTS

| | | | |
|---|---|---|---|
| 6,088,035 A | 7/2000 | Sudarsky et al. | |
| 8,756,085 B1 * | 6/2014 | Plummer .............. | G06Q 40/00 705/4 |

(Continued)

OTHER PUBLICATIONS

Wang, M., et al., "Lidar data segmentation and classification based on octree structure", International Archives of Photogrammetry and Remote Sensing, vol. 20, B3, pp. 308-313, 2004.

(Continued)

*Primary Examiner* — Wesley Tucker
(74) *Attorney, Agent, or Firm* — Gates & Cooper LLP (57) ABSTRACT

A method, apparatus, system, and computer readable storage medium provide the ability to pre-segment point cloud data. Point cloud data is obtained and segmented. The segment information is stored. An indexing structure is created and instantiated with the point cloud data and the segment information. Based on the segment information, a determination is made regarding points needed for shape extraction. Needed points are fetched from the indexing structure an used to extract shapes. The extracted shapes are used to cull points from the point cloud data.

16 Claims, 6 Drawing Sheets

(56) References Cited

U.S. PATENT DOCUMENTS

| | | | |
|---|---|---|---|
| 8,872,851 B2* | 10/2014 | El Choubassi | G06T 7/0081 |
| | | | 345/633 |
| 9,053,547 B2* | 6/2015 | Kitamura | G01B 11/24 |
| 9,153,061 B2* | 10/2015 | Vaddadi | G06T 15/005 |
| 9,189,862 B2* | 11/2015 | Fu | G06T 7/0085 |
| 9,189,888 B1* | 11/2015 | Cte | G06T 17/00 |
| 2005/0135670 A1* | 6/2005 | Vaidyanathan | G06T 7/0057 |
| | | | 382/154 |
| 2008/0238919 A1 | 10/2008 | Pack | |
| 2014/0278265 A1* | 9/2014 | Anderson | G06F 17/50 |
| | | | 703/1 |
| 2015/0009214 A1* | 1/2015 | Lee | G06T 7/0046 |
| | | | 345/420 |
| 2015/0138310 A1* | 5/2015 | Fan | G06K 9/00201 |
| | | | 348/36 |
| 2015/0213644 A1* | 7/2015 | Cha | G06T 17/10 |
| | | | 345/420 |
| 2016/0117858 A1* | 4/2016 | Wu | G06T 11/20 |
| | | | 345/420 |
| 2016/0154999 A1* | 6/2016 | Fan | G06K 9/00637 |
| | | | 382/103 |
| 2016/0155265 A1* | 6/2016 | Chang | G06T 17/20 |
| | | | 345/419 |

OTHER PUBLICATIONS

He et al., "Automatic Orientation Estimation of Multiple Images With Respect to Laser Data"; ASPRS 2014 Annual Conference Louisville, Kentucky; Mar. 23-28, 2014.

Ivanov, "Practical Texture Atlases"; https://web.archive.org/web/20080227091353/http://www.gamasutra.com/view/feature/2530/practical_texture_atlases.php?print=1; captured by the Internet Archive on Feb. 27, 2008.

Correa et al; "iWalk: Interactive Out-of-Core Rendering of Large Models"; Technical Report TR-653-02, Princeton University, 2002.

Mastin et al., "Automatic Registration of LIDAR and Optical Images of Urban Scenes"; IEEE 2009.

* cited by examiner

PRE-SEGMENT POINT CLOUD DATA TO RUN REAL-TIME SHAPE EXTRACTION FASTER

CROSS-REFERENCE TO RELATED APPLICATIONS

This application claims the benefit under 35 U.S.C. Section 119(e) of the following and commonly-assigned U.S. provisional patent application(s), which is/are incorporated by reference herein:

Provisional Application Ser. No. 61/901,069, filed on Nov. 7, 2013, by Ronald Poelman and Oytun Akman, entitled "Pre-Segment Point Cloud Data to Run Real-Time Shape Extraction Faster."

This application is related to the following and commonly-assigned patent application, which application is incorporated by reference herein:

U.S. patent application Ser. No. 14/536,232, entitled "OCCLUSION RENDER MECHANISM FOR POINT CLOUDS", by Paulus Jacobus Holverda and Ronald Poelman, filed on the same data herewith, which application claims the benefit under 35 U.S.C. Section 119(e) of Provisional Application Ser. No. 61/901,067, filed on Nov. 7, 2013, by Paul Holverda and Ronald Poelman, entitled "Occlusion Render Mechanism for Point Clouds."

BACKGROUND OF THE INVENTION

1. Field of the Invention

The present invention relates generally to point cloud data, and in particular, to a method, apparatus, and article of manufacture for pre-segmenting point cloud data to run real-time shape extraction faster.

2. Description of the Related Art

Point cloud shape/feature extraction is a highly desired technique to facilitate the computer aided design (CAD) workflow. CAD designers don't want to snap to point clouds but prefer to work with planes, corners, and center lines. Laser scanners sample a surface without any knowledge of what is being sampling. Snapping to inferred geometry in real-time is problematic—enough points need to be available to create a decent representation, and fitting geometry is computationally intensive (on a large and/or reduced set of points). Accordingly, what is needed is the capability to quickly and accurately extract shapes/features from a point cloud. To better understand these problems, a description of prior art point cloud systems may be useful.

Point clouds are often created by reality capture devices such as laser three-dimensional (3D) scanners that measure a large number of points (e.g., from thousands to many billions of points [3D coordinates]) on the surface of an object, and output a point cloud as a data file. The point cloud represents the visible surface of the object that has been scanned or digitized. With the increased usage of such reality capture devices, large point cloud data sets are more frequently created for consumption by design applications. The challenge that design software faces is visualizing and using this data efficiently in the applications. While the point cloud data set is often very large, the number of points an application is capable of handling for visualization and other needs is a small fraction—a few million points, for example. Prior art methods fail to provide the ability to process the massive volume of points, in real time (e.g., preserving a ten [10] frames per second or faster rate) to read a small fraction of points that have the property of accurately representing the original data set without loss of detail or information that causes misrepresentation of the original data.

Point cloud visualization and applications are increasingly important in design, especially due to the decrease in the price point of the technology. Point clouds can contain an enormous number of points. One of the major challenges is representing the set of points while providing the ability to extract a small subset that is highly representative of the spatial region of interest.

As described above, a point cloud is created using a laser beam/scanner that scans objects/surfaces to obtain millions of points. For example, an image scanner on top of a car that drives through a city may obtain millions upon millions of points. If such points are rendered in a certain environment, different viewpoints may be queried/requested and displayed to a user. However, with a point cloud, if a scene is rendered, the depth component may not map properly. As a result, a visualization of a point cloud may require one thousand (1000) times of overdraw before the correct visualization is achieved.

Prior art methodologies may attempt to select a subset of the points in a quick and efficient manner. One approach divides a volume of interest into equal size rectangular 3D cells. Each of the thousands of cells may contain millions of points. The issue arises as to how to determine how many and which points to select from/in a cell. Further, point cloud data resulting from a scanner may have various artifacts that are undesirable. Accordingly, there is a desire to eliminate the scanner artifact, to normalize the point selection, and to obtain a uniform distribution/real depiction of the distribution of the point cloud data regardless of the location of the scanner. Many prior art approaches have attempted to solve such problems. Such approaches range from nearest neighbor based approaches to frequency domain based approaches. Concepts of downsampling, borrowed from image processing techniques have also been incorporated in solutions to view large point data sets. Goals of some techniques include noise removal and optimal representation, at the expense of computation and with freedom to modify the original point set.

In addition, as described above, to facilitate CAD workflows, a CAD system may extract shapes/features from the points. It is desirable to perform such extraction in real time. If the extraction is attempted on a large set of points, it can be computationally intensive. However, if the extraction is attempted on a minimized set of points, the error rate increases (e.g., shape extraction/fitting may not be accurate and/or may not be possible due to an insufficient number/range of points). Accordingly, what is needed is a method and apparatus that reduces the number of points from a point cloud in order to properly, accurately, and efficiently extract shapes/features.

SUMMARY OF THE INVENTION

During the indexing process (e.g., the creation of an octree of scanned point cloud data), the point cloud data is segmented. Segment information (e.g., the bounding box) of the various segments are stored into the indexed file. When later reading the point cloud data (e.g., during a snap to inferred geometry query), the segment information is used to only fetch the points necessary to perform a shape extraction. Once shape extraction is performed, the shapes can then be fetched in real time in response to the desired user operation (e.g., a snap operation).

BRIEF DESCRIPTION OF THE DRAWINGS

Referring now to the drawings in which like reference numbers represent corresponding parts throughout.

DETAILED DESCRIPTION OF THE PREFERRED EMBODIMENTS

In the following description, reference is made to the accompanying drawings which form a part hereof, and which is shown, by way of illustration, several embodiments of the present invention. It is understood that other embodiments may be utilized and structural changes may be made without departing from the scope of the present invention.

Overview

Embodiments of the invention pre-segment data from a point cloud and store a bounding box of a segment into an indexed file that is used during shape/feature extraction.

Hardware Environment

Figure 1:
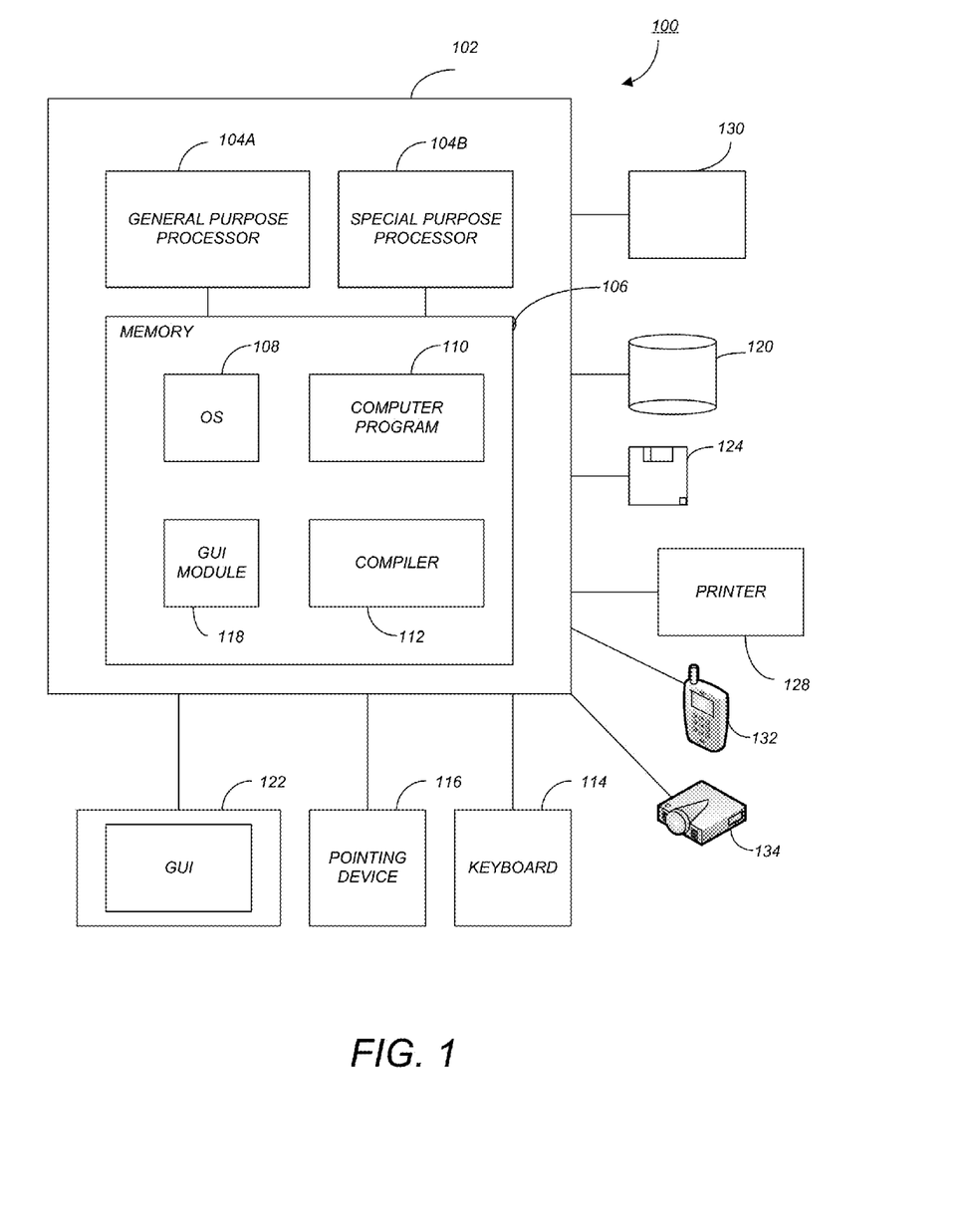
FIG. 1 is an exemplary hardware and software environment used to implement one or more embodiments of the invention.

FIG. 1 is an exemplary hardware and software environment 100 used to implement one or more embodiments of the invention. The hardware and software environment includes a computer 102 and may include peripherals. Computer 102 may be a user/client computer, server computer, or may be a database computer. The computer 102 comprises a general purpose hardware processor 104A and/or a special purpose hardware processor 104B (hereinafter alternatively collectively referred to as processor 104) and a memory 106, such as random access memory (RAM). The computer 102 may be coupled to, and/or integrated with, other devices, including input/output (I/O) devices such as a keyboard 114, a cursor control device 116 (e.g., a mouse, a pointing device, pen and tablet, touch screen, multi-touch device, etc.) and a printer 128. In one or more embodiments, computer 102 may be coupled to, or may comprise, a portable or media viewing/listening device 132 (e.g., an MP3 player, iPod™, Nook™, portable digital video player, cellular device, personal digital assistant, etc.). In yet another embodiment, the computer 102 may comprise a multi-touch device, mobile phone, gaming system, internet enabled television, television set top box, or other internet enabled device executing on various platforms and operating systems.

In one or more embodiments, computer 102 is communicatively coupled to, or may comprise, a laser scanner 134. Such a laser scanner 134 may consist of a field measurement device capable of producing a 3D representation of present conditions through the collection of individually measured points. The set of all points collected and registered with another after the scanning process is referred to as a point cloud. Such a point cloud may be stored in data storage devices 120/124, within the scanner 134, in memory 106, and/or in any other device capable of storing such information. The laser scanner 134 may utilize a variety of scanning methods including aerial, static, and mobile. Such laser scanning may scan millions of point in seconds without climbing on equipment and/or conducting contact measurements.

In one embodiment, the computer 102 operates by the general purpose processor 104A performing instructions defined by the computer program 110 under control of an operating system 108. The computer program 110 and/or the operating system 108 may be stored in the memory 106 and may interface with the user and/or other devices to accept input and commands and, based on such input and commands and the instructions defined by the computer program 110 and operating system 108, to provide output and results.

Output/results may be presented on the display 122 or provided to another device for presentation or further processing or action. In one embodiment, the display 122 comprises a liquid crystal display (LCD) having a plurality of separately addressable liquid crystals. Alternatively, the display 122 may comprise a light emitting diode (LED) display having clusters of red, green and blue diodes driven together to form full-color pixels. Each liquid crystal or pixel of the display 122 changes to an opaque or translucent state to form a part of the image on the display in response to the data or information generated by the processor 104 from the application of the instructions of the computer program 110 and/or operating system 108 to the input and commands. The image may be provided through a graphical user interface (GUI) module 118. Although the GUI module 118 is depicted as a separate module, the instructions performing the GUI functions can be resident or distributed in the operating system 108, the computer program 110, or implemented with special purpose memory and processors.

In one or more embodiments, the display 122 is integrated with/into the computer 102 and comprises a multi-touch device having a touch sensing surface (e.g., track pod or touch screen) with the ability to recognize the presence of two or more points of contact with the surface. Examples of multi-touch devices include mobile devices (e.g., iPhone™, Nexus S™, Droid™ devices, etc.), tablet computers (e.g., iPad™, HP Touchpad™), portable/handheld game/music/video player/console devices (e.g., iPod Touch™, MP3 players, Nintendo 3DS™, PlayStation Portable™, etc.), touch tables, and walls (e.g., where an image is projected through acrylic and/or glass, and the image is then backlit with LEDs).

Some or all of the operations performed by the computer 102 according to the computer program 110 instructions may be implemented in a special purpose processor 104B. In this embodiment, some or all of the computer program 110 instructions may be implemented via firmware instructions stored in a read only memory (ROM), a programmable read only memory (PROM) or flash memory within the special purpose processor 104B or in memory 106. The special purpose processor 104B may also be hardwired through circuit design to perform some or all of the operations to implement the present invention. Further, the special purpose processor 104B may be a hybrid processor, which includes dedicated circuitry for performing a subset of functions, and other circuits for performing more general functions such as responding to computer program 110 instructions. In one embodiment, the special purpose processor 104B is an application specific integrated circuit (ASIC).

The computer 102 may also implement a compiler 112 that allows an application or computer program 110 written in a programming language such as COBOL, Pascal, C++, FORTRAN, or other language to be translated into processor 104 readable code. Alternatively, the compiler 112 may be an interpreter that executes instructions/source code directly, translates source code into an intermediate representation that is executed, or that executes stored precompiled code. Such source code may be written in a variety of programming languages such as Java™, Perl™, Basic™, etc. After completion, the application or computer program 110 accesses and manipulates data accepted from I/O devices and stored in the memory 106 of the computer 102 using the relationships and logic that were generated using the compiler 112.

The computer 102 also optionally comprises an external communication device such as a modem, satellite link, Ethernet card, or other device for accepting input from, and providing output to, other computers 102.

In one embodiment, instructions implementing the operating system 108, the computer program 110, and the compiler 112 are tangibly embodied in a non-transitory computer-readable medium, e.g., data storage device 120, which could include one or more fixed or removable data storage devices, such as a zip drive, floppy disc drive 124, hard drive, CD-ROM drive, tape drive, etc. Further, the operating system 108 and the computer program 110 are comprised of computer program 110 instructions which, when accessed, read and executed by the computer 102, cause the computer 102 to perform the steps necessary to implement and/or use the present invention or to load the program of instructions into a memory 106, thus creating a special purpose data structure causing the computer 102 to operate as a specially programmed computer executing the method steps described herein. Computer program 110 and/or operating instructions may also be tangibly embodied in memory 106, data storage device 120/124 and/or data communications devices 130, thereby making a computer program product or article of manufacture according to the invention. As such, the terms "article of manufacture," "program storage device," and "computer program product," as used herein, are intended to encompass a computer program accessible from any computer readable device or media.

Of course, those skilled in the art will recognize that any combination of the above components, or any number of different components, peripherals, and other devices, may be used with the computer 102.

Figure 2:
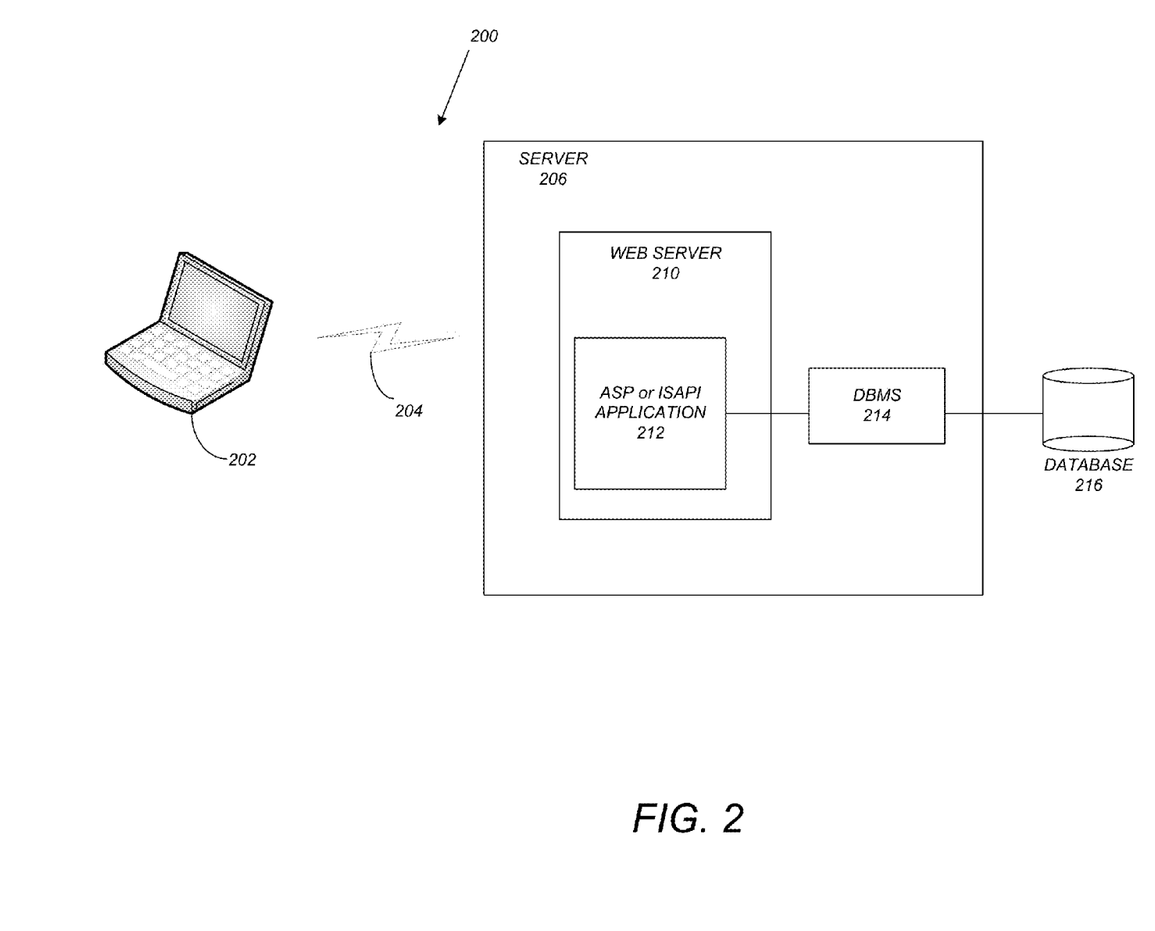
FIG. 2 schematically illustrates a typical distributed computer system using a network to connect client computers to server computers in accordance with one or more embodiments of the invention.

FIG. 2 schematically illustrates a typical distributed computer system 200 using a network 204 to connect client computers 202 to server computers 206. A typical combination of resources may include a network 204 comprising the Internet, LANs (local area networks), WANs (wide area networks), SNA (systems network architecture) networks, or the like, clients 202 that are personal computers or workstations (as set forth in FIG. 1), and servers 206 that are personal computers, workstations, minicomputers, or mainframes (as set forth in FIG. 1). However, it may be noted that different networks such as a cellular network (e.g., GSM [global system for mobile communications] or otherwise), a satellite based network, or any other type of network may be used to connect clients 202 and servers 206 in accordance with embodiments of the invention.

A network 204 such as the Internet connects clients 202 to server computers 206. Network 204 may utilize ethernet, coaxial cable, wireless communications, radio frequency (RF), etc. to connect and provide the communication between clients 202 and servers 206. Clients 202 may execute a client application or web browser and communicate with server computers 206 executing web servers 210. Such a web browser is typically a program such as MICROSOFT INTERNET EXPLORER™, MOZILLA FIREFOX™, OPERA™, APPLE SAFARI™, GOOGLE CHROME™, etc. Further, the software executing on clients 202 may be downloaded from server computer 206 to client computers 202 and installed as a plug-in or ACTIVEX™ control of a web browser. Accordingly, clients 202 may utilize ACTIVEX™ components/component object model (COM) or distributed COM (DCOM) components to provide a user interface on a display of client 202. The web server 210 is typically a program such as MICROSOFT'S INTERNET INFORMATION SERVER™.

Web server 210 may host an Active Server Page (ASP) or Internet Server Application Programming Interface (ISAPI) application 212, which may be executing scripts. The scripts invoke objects that execute business logic (referred to as business objects). The business objects then manipulate data in database 216 through a database management system (DBMS) 214. Alternatively, database 216 may be part of, or connected directly to, client 202 instead of communicating/obtaining the information from database 216 across network 204. When a developer encapsulates the business functionality into objects, the system may be referred to as a component object model (COM) system. Accordingly, the scripts executing on web server 210 (and/or application 212) invoke COM objects that implement the business logic. Further, server 206 may utilize MICROSOFT'S™ Transaction Server (MTS) to access required data stored in database 216 via an interface such as ADO (Active Data Objects), OLE DB (Object Linking and Embedding DataBase), or ODBC (Open DataBase Connectivity).

Generally, these components 200-216 all comprise logic and/or data that is embodied in/or retrievable from device, medium, signal, or carrier, e.g., a data storage device, a data communications device, a remote computer or device coupled to the computer via a network or via another data communications device, etc. Moreover, this logic and/or data, when read, executed, and/or interpreted, results in the steps necessary to implement and/or use the present invention being performed.

Although the terms "user computer", "client computer", and/or "server computer" are referred to herein, it is understood that such computers 202 and 206 may be interchangeable and may further include thin client devices with limited or full processing capabilities, portable devices such as cell phones, notebook computers, pocket computers, multi-touch devices, and/or any other devices with suitable processing, communication, and input/output capability.

Of course, those skilled in the art will recognize that any combination of the above components, or any number of different components, peripherals, and other devices, may be used with computers 202 and 206.

Software Embodiment

As described above, when attempting to render millions/billions of points in real-time, a point cloud is processed. Such processing may result in a significant bottleneck. Consequently, as part of the processing, points that are not relevant to the screen space representation may be culled. To cull such points, systems may attempt to calculate planes/polygons with textures to represent the point cloud and cull the point cloud data using such planes/polygons (e.g., as described in the copending application cross-referenced above). One issue that arises is how to quickly and efficiently recognize the planes/polygons as a representation of the point cloud. Embodiments of the invention provide a methodology and system for facilitating the extraction of shapes/features/planes/polygons.

Figure 3:
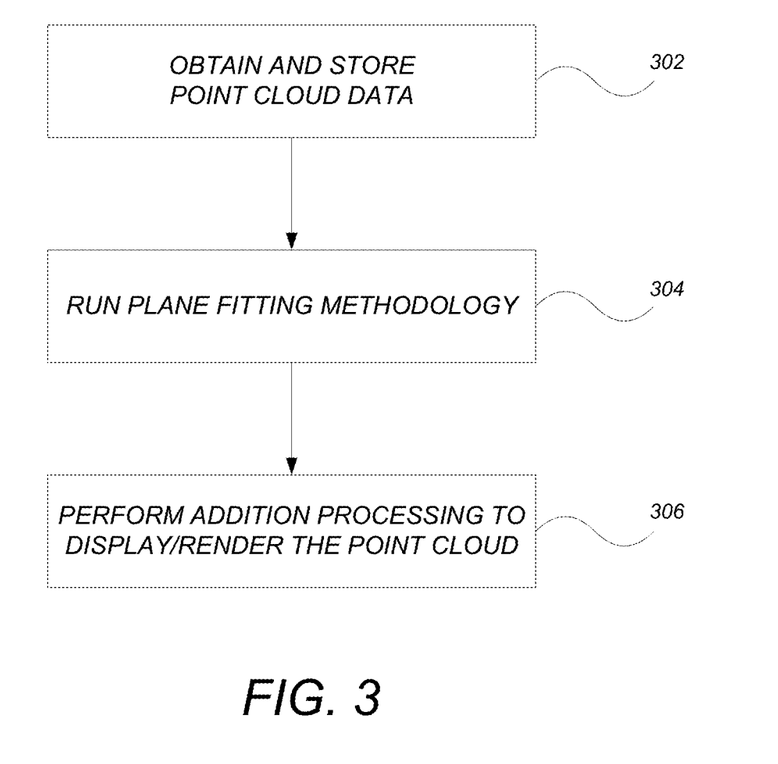
FIG. 3 illustrates the logical flow for processing a point cloud in accordance with one or more embodiments of the invention.
Figure 4:
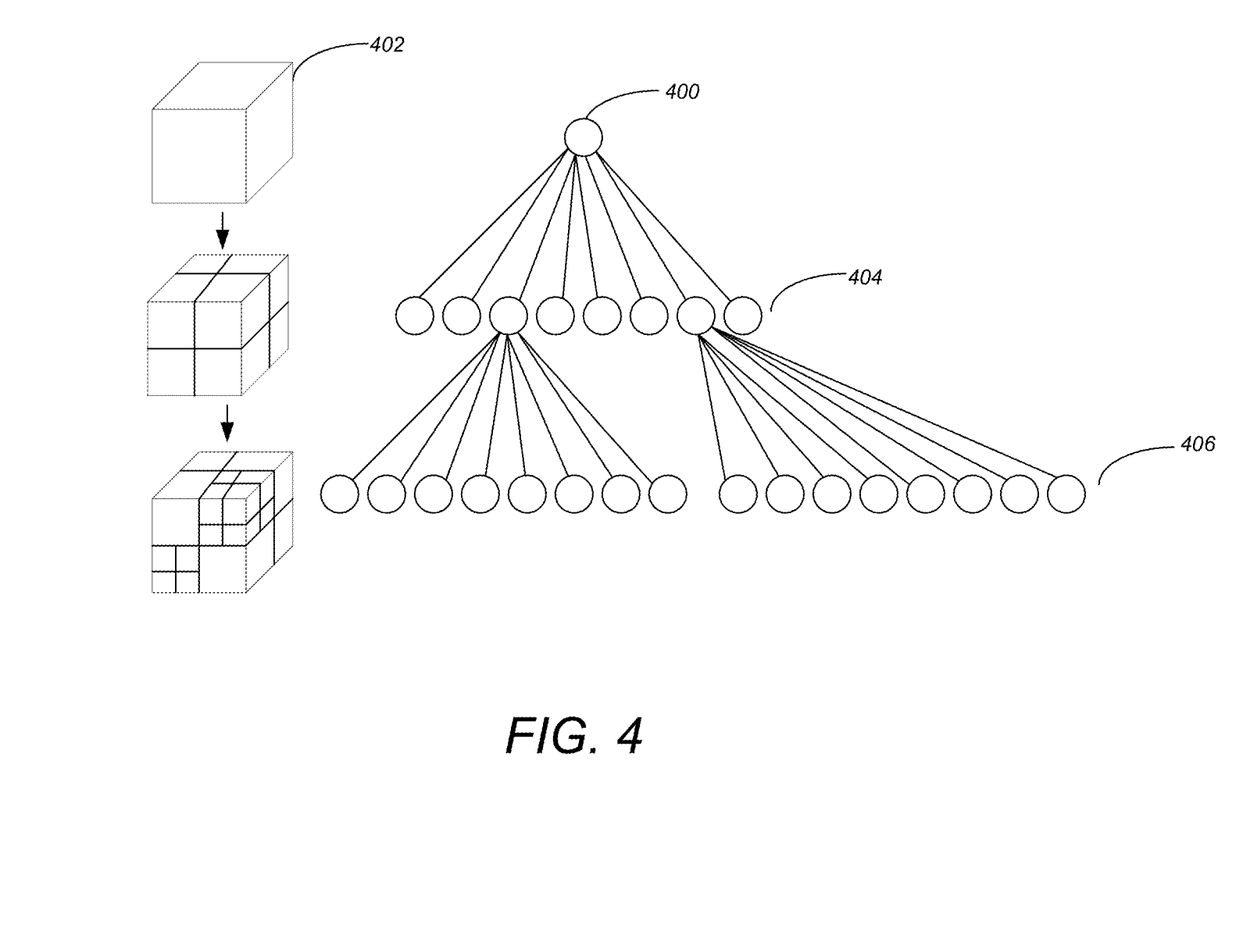
FIG. 4 illustrates an exemplary octree structure in accordance with one or more embodiments of the invention.

FIG. 3 illustrates the logical flow for processing a point cloud in accordance with one or more embodiments of the invention. At step 302, point cloud data is obtained (e.g., from a laser scanner) and stored in an octree structure. The creation of an octree structure based on scanned point cloud data may also be referred to as the indexing of the point cloud data (as it is indexed into the octree structure). FIG. 4 illustrates an exemplary octree structure in accordance with one or more embodiments of the invention. An octree structure provides a hierarchical tree data structure for the point cloud data. In other words, an octree is a tree-based data structure for organizing and parsing 3D data. Such a structure enables spatial portioning, downsampling, and search operations on the point data set. Each octree node has either eight children or no children. The root node 400 describes a cubic bounding box 402 that encapsulates all points. At every level 404/406, the space becomes subdivided by a factor of two (2) which results in an increased voxel (i.e., a volumetric pixel that represents a value on a regular grid in 3D space) resolution.

At step 304, at a relevant tree depth distance (determined by size or amount of points), a plane fitting methodology is run (e.g., based on RANSAC [RANdom Sample Consensus]). RANSAC is an iterative method used to estimate parameters of a mathematical model from a set of observed data that contains outliers. Accordingly, at step 304, embodiments of the invention iteratively attempt to find all of the planes and clip them with the bounds of the relevant tree depth leaf node. Examples of such a plane fitting include least squares fitting (LSF) and principal component analysis (PCA). In LSF, an iterative method is used to find the best-fit plane with the least-squares constraint of the distances from the scanned points to the plane (e.g., see Wang, M. and Tseng, Y.-H., 2004, Lidar data segmentation and classification based on octree structure, International Archives of Photogrammetry and Remote Sensing, Vol. 20, B3, pp. 308-313 which is incorporated by reference herein).

More specifically, in step 304, an attempt is made to create and fit planes on all the points within a predefined level of detail of the octree. The number of planes is dependent on the amount of points that conform to the plane fitting procedure and within a certain threshold. In this regard, the threshold may determine whether a maximum and/or minimum number of points are present in a predefined level. For example, a minimum number of points may be required in order to perform plane fitting (e.g., one or two points may not comply with the minimum threshold number of points while ten points may be sufficient). Similarly, too many points may be overly burdensome to perform the plane fitting (e.g., consumes a disproportionate amount of processing and/or time).

In view of the above, if level 404 is identified as the relevant level, the points within the nodes below level 404 would be used for the plane fitting procedures. Thus, the appropriate octree level may be determined based on size (of the bounds of the level) or amount of points.

If based on the number/amount of points, the plane fitting process may progressively select sequential levels of the octree until a sufficient/maximum number of points/per node for processing has been reached. For example, suppose the plane fitting can process a maximum number of 25,000 points. If level 400 has one million points, the plane fitting may proceed to level 404 which may have 125,000 points. Since 125,000 is still beyond the maximum number of permissible points, the plane fitting may proceed to level 406 which could have 15,625 points per node. Since level 406 provides a number of points per node within the processing threshold, the plane fitting may identify level 406 as the relevant level.

During the plane fitting, the detected planes are clipped with the bounds of the determined leaf node level of the octree to create representative polygons.

Returning to FIG. 3, at step 306, additional processing may be performed on the planes/polygons, as necessary, in order to display/render the point cloud in an efficient manner.

While the steps performed in FIG. 3 may be useful and expedite the processing/culling points in a point cloud, performing such steps in real-time on millions/billions of points may be problematic. To facilitate the processing, embodiments of the invention pre-segment the point cloud data during step 302 of FIG. 3.

Figure 5:
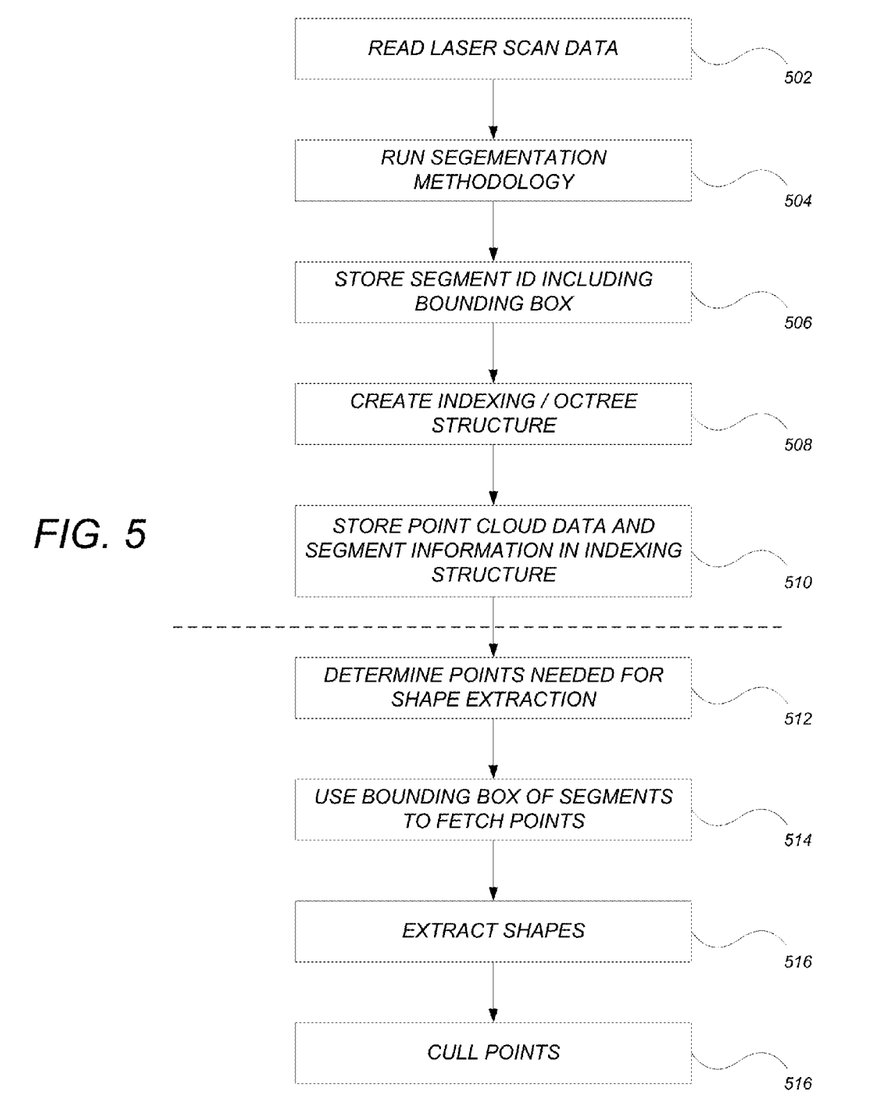
FIG. 5 illustrates the pre-segmenting of point cloud data in accordance with one or more embodiments of the invention.

FIG. 5 illustrates the pre-segmenting of point cloud data in accordance with one or more embodiments of the invention. In this regard, the steps of FIG. 5 may be performed during the indexing process (creation of octree of scanned point cloud data files).

At step 502, the laser scan data (e.g., point cloud data) is read.

At step 504, a segmentation based methodology is executed (e.g., a depth image based segmentation methodology).

Figure 6:
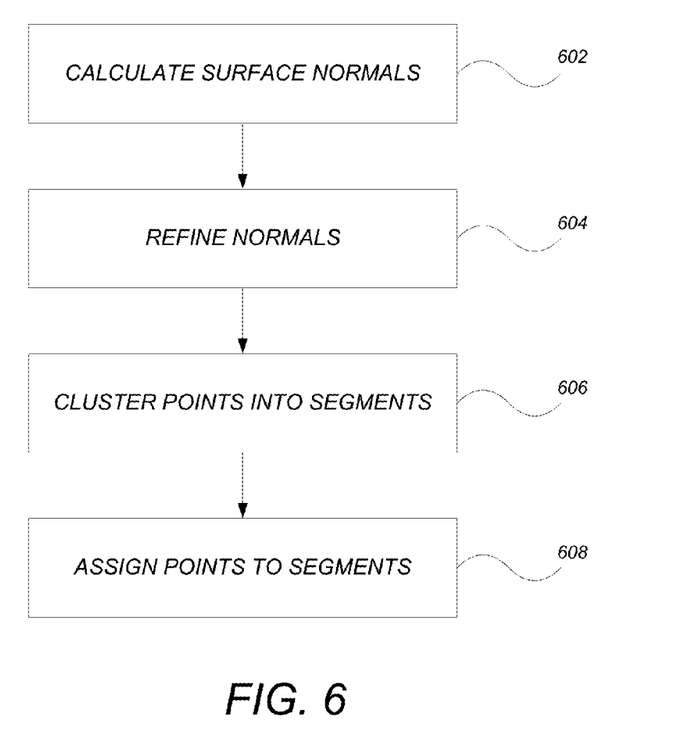
FIG. 6 illustrates an exemplary segmentation based methodology that may be used in accordance with one or more embodiments of the invention.

FIG. 6 illustrates an exemplary segmentation based methodology that may be used in accordance with one or more embodiments of the invention. However, the invention is not limited to such a methodology and any type of methodology may be utilized.

At step 602, the surface normal of each 3D point is calculated using its spatial neighborhood.

At step 604, the surface normals are refined by assigning each point to a surface type such as smooth planar, jump edge, etc. and updating its normal information using its neighbors that belong to the same surface type. Refinement step 604 increases the normal precision especially on the edge points.

At step 606, the 3D points are clustered into segments (e.g., using a region growing methodology/algorithm). During region growing, two points are assigned to the same segment if they are spatially close (plane-to-point distances) and the angle between their surface normals is smaller than some certain threshold. The clustering starts with selecting a seed point and recursively adding new neighbor (8-neighborhood) points to the seed point's segment if the neighbor points satisfy the conditions explained above.

Figure 7:
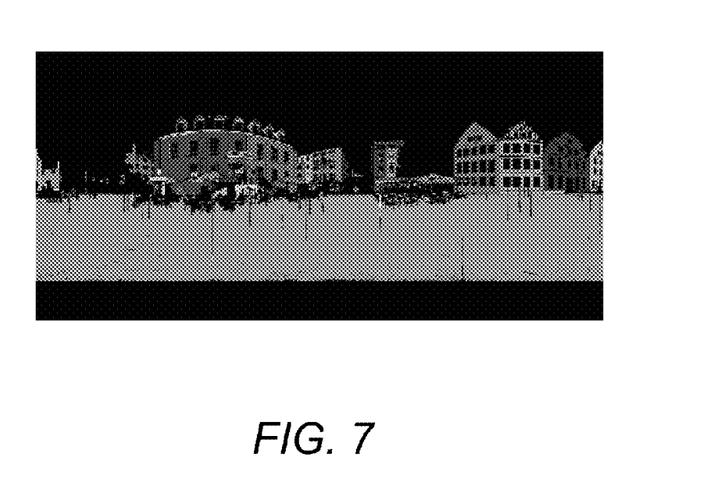
FIG. 7 illustrates a point cloud that has been segmented in accordance with one or more embodiments of the invention.

When the clustering/region growing step 606 is finished, all 3D points are assigned to a segment at step 608. FIG. 7 illustrates a point cloud that has been segmented in accordance with one or more embodiments of the invention. Calculated segments may be shown in different colors (illustrated as different shades of gray in FIG. 7). Moreover, during the segmentation steps 606 and 608, various information/parameters such as planarity, homogeneity, and bounding box are also extracted for each segment.

Returning to FIG. 5, from the results at step 504, the segment identification including the bounding box for the segment is stored at step 506.

At step 508, an indexing structure (e.g., an octree structure) for the point cloud data is created/generated.

At step 510, the point cloud data and the segment information (e.g., the segment identification and the bounding box) are stored in the indexing structure. It may be noted that since the data is being read for processing into the octree, this additional pre-segmenting computation is cheap (i.e., the additional computation does not consume significant processing or time). The segment information (e.g., bounding box and segment ID) may be stored in the octree/indexing structure or may be stored in a separate file. In addition, steps 506 and 510 may be combined into a single storage operation.

Once stored in the octree, the indexing process is complete and the indexing structure can be used to provide real-time shape extraction when working with the point cloud data (e.g., in steps 512-514) (i.e., when extracting points and shapes from an indexing structure).

At step 512, when invoking a query (e.g., of the indexing structure) to snap to inferred geometry, the segment information (e.g., the bounding boxes of the segments) is used to determine which points are needed for shape extraction.

At step 514, the determined points are fetched.

At step 516, the points are used to extract shapes (i.e., a shape extraction methodology is executed using the fetched points). Embodiments of the invention are not limited to particular shape extraction methodologies. Some methodologies may be non-real-time with no manual intervention, while others are real-time and less precise. Embodiments of the invention may combine the best of both online and offline methodologies. For instance, least-squares based shape extraction methods can be used to fit the best shape to the points from the same segments. While this approach is sensitive to outliers, it is fast and computationally cheap. On the other hand, computationally more expensive but robust and accurate methods utilizing non-linear optimization methods or RANSAC+least-squares can be used when the shape extraction algorithms are not required to run in real time.

At step 516, the extracted shapes are used to cull/retrieve points.

Thus, as described above, when working with point cloud data, users may often desire to perform a snap operation (e.g., move the cursor to a particular point/location, attach objects to a point/object such as a vertex, corner, plane, midpoint, center, etc.). Performing such a snap operation in real-time is also highly desirable. However, working with millions of points in point cloud data, such real-time operations are often difficult if not impossible. Accordingly, geometry is often inferred from point cloud data. Snapping to inferred geometry is problematic—enough points need to be available to create a decent representation and fitting geometry is computationally intensive. Embodiments of the invention overcome such problems using the pre-segmenting steps described above. Once pre-segmented, the segment information is used during the shape/feature extraction process. In this regard, the shape/feature extraction process utilizes the segment information to retrieve only those points that are needed to provide a decent and workable representation of the point cloud data. More specifically, once pre-segmented (e.g., steps 502-510), the characteristics of the segment and the segment parameters/information can be used to cull points and fetch shapes in real time (e.g., steps 512-516). Such characteristics/parameters of the segment may include the segment's size in 2D/3D (bounding box), homogeneity (if the segment consists of smooth surfaces), and planarity (if the surface is planar).

In view of the above, during the indexing process, the data is pre-segmented and the bounding box of the segment is stored into the indexed octree file. Thereafter, when utilizing the indexed point cloud data, the pre-segmented data is used to quickly determine and fetch points necessary for shape extraction.

CONCLUSION

This concludes the description of the preferred embodiment of the invention. The following describes some alternative embodiments for accomplishing the present invention. For example, any type of computer, such as a mainframe, minicomputer, or personal computer, or computer configuration, such as a timesharing mainframe, local area network, or standalone personal computer, could be used with the present invention.

In summary, embodiments of the invention provide very accurate, high frame rate shape extraction on very large point clouds. Such shape extraction allows CAD users to work with inferred geometry without feeling the operation that provides the accurate real-time shape extraction.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A computer-implemented method for pre-segmenting point cloud data, the method comprising the steps of:
   obtaining point cloud data;
   segmenting the point cloud data;
   storing segment information for the segmented point cloud data;
   creating an indexing structure;
   storing the point cloud data and the segment information into the indexing structure;
   determining, based on the segment information, points needed for shape extraction;
   fetching the points needed for shape extraction from the indexing structure;
   extracting one or more shapes based on the fetched points; and
   utilizing the extracted one or more shapes to cull points from the point cloud data.

2. The computer-implemented method of claim 1, further comprising:
   creating and fitting planes on the point cloud data;
   culling the point cloud data based on the planes; and
   rendering the culled point cloud data; and
   wherein the pre-segmenting steps are performed during an indexing of the point cloud data.

3. The computer-implemented method of claim 1, wherein the segmenting comprises:
   calculating a surface normal of each point in the point cloud data using a spatial neighborhood of each point;
   refining the surface normals by assigning each point to a surface type and updating normal information using neighbors that belong to a same surface type; and
   clustering the points in the point cloud data into segments based on spatial proximity and surface normal angles.

4. The computer-implemented method of claim 1, wherein the indexing structure comprises an octree structure.

5. The computer-implemented method of claim 1, wherein the segment information comprises:
   a segment identification; and
   a bounding box.

6. The computer-implemented method of claim 5, wherein the segment information further comprises homogeneity information and planarity.

7. The computer-implemented method of claim 1, wherein the extracting comprises a least squares based shape extraction.

8. The computer-implemented method of claim 7, wherein the extracting further comprises a RANdom Sample Consensus (RANSAC) method.

9. A non-transitory computer readable storage medium encoded with computer program instructions which when accessed by a computer cause the computer to load the program instructions to a memory therein creating a special purpose data structure causing the computer to operate as a specially programmed computer, executing a method of pre-segmenting point cloud data, the method comprising the steps of:
   obtaining, in the specially programmed computer, point cloud data;
   segmenting, in the specially programmed computer, the point cloud data;
   storing, in the specially programmed computer, segment information for the segmented point cloud data;
   creating, in the specially programmed computer, an indexing structure;
   storing, in the specially programmed computer, the point cloud data and the segment information into the indexing structure;
   determining, in the specially programmed computer, based on the segment information, points needed for shape extraction;
   fetching, in the specially programmed computer, the points needed for shape extraction from the indexing structure;
   extracting, in the specially programmed computer, one or more shapes based on the fetched points; and
   utilizing, in the specially programmed computer, the extracted one or more shapes to cull points from the point cloud data.

10. The non-transitory computer readable storage medium of claim 9, further comprising:
    creating and fitting, in the specially programmed computer, planes on the point cloud data;
    culling, in the specially programmed computer, the point cloud data based on the planes; and
    rendering, in the specially programmed computer, the culled point cloud data; and
    wherein the pre-segmenting steps are performed during an indexing of the point cloud data.

11. The non-transitory computer readable storage medium of claim 9, wherein the segmenting comprises:
    calculating, in the specially programmed computer, a surface normal of each point in the point cloud data using a spatial neighborhood of each point;
    refining, in the specially programmed computer, the surface normals by assigning each point to a surface type and updating normal information using neighbors that belong to a same surface type; and
    clustering, in the specially programmed computer, the points in the point cloud data into segments based on spatial proximity and surface normal angles.

12. The non-transitory computer readable storage medium of claim 9, wherein the indexing structure comprises an octree structure.

13. The non-transitory computer readable storage medium of claim 9, wherein the segment information comprises:
    a segment identification; and
    a bounding box.

14. The non-transitory computer readable storage medium of claim 13, wherein the segment information further comprises homogeneity information and planarity.

15. The non-transitory computer readable storage medium of claim 9, wherein the extracting comprises a least squares based shape extraction.

16. The non-transitory computer readable storage medium of claim 15, wherein the extracting further comprises a RANdom Sample Consensus (RANSAC) method.

* * * * *